United States Patent Office 3,337,517
Patented Aug. 22, 1967

3,337,517
METHOD OF PROVIDING AMIDE POLYMERS
Harry D. Anspon, Kansas City, Mo., assignor to Gulf Research & Development Company, Pittsburgh, Pa., a corporation of Delaware
No Drawing. Filed Mar. 21, 1966, Ser. No. 535,743
13 Claims. (Cl. 260—86.7)

This invention relates to novel interpolymers of ethylene and processes related thereto. More particularly, this invention relates to ethylene-acrylate interpolymers in which a substantial portion of the acrylate groups are in amide form.

This is a continuation-in-part application of copending United States application Ser. No. 137,018, now abandoned, filed Sept. 11, 1961.

Generally speaking, polymers having a relatively high stiffness, which is required for fabrication of articles in which a rigidity or stiffness of shape is required, rate relatively poor as to certain other desired characteristics, such as resistance to damage on impact. For example, many highly stiff polyethylenes, isotactic polypropylenes, nylons, polystyrenes, and polyacrylate esters do indeed have high stiffness values, but are susceptible to damage such as shattering and fracturing when subjected to impact forces. Low cost polymers are therefore desired which provide the unusual combination of high stiffness values and excellent resistance to damage on impact, along with other advantageous properties.

Accordingly, there are provided by this invention stiff, impact-resistant, normally-solid ethylene-acrylate interpolymers of about 0.01 to about 0.5 mole parts of groups corresponding to acrylate per mole of contained groups corresponding to ethylene, the acrylate groups being present up to about ninety percent in alkyl ester form in which the alkyl group has from one to about twenty carbon atoms and about ten to one hundred percent of the acrylate groups being present in amide form. Up to about ten mole percent of the acrylate groups can be present in carboxylate form.

Desirably, the polymers provided hereby are of about 0.025 to about 0.25 (preferably from 0.05 to 0.15) mole of groups corresponding to acrylate per mole of groups corresponding to ethylene groups, the acrylate groups being present up to about eighty percent in alkyl ester form as hereinabove defined, from about twenty to about ninety percent of the acrylate groups being present in amide form, and up to about three percent in carboxylate form.

The interpolymers of this invention can be and preferably are readily provided by starting with an ethylene-alkyl acrylate copolymer, preferably the starting ethylene-alkyl acrylate copolymer being of a highly uniform character inasmuch as the alkyl acrylate groups are evenly distributed throughout the polymeric chains. Highly suitable acrylate copolymers for use in this invention are the ethylene-alkyl acrylate copolymers in which the alkyl acrylate can be an alkyl ester of unsubstituted acrylic acid or a simply substituted alpha-acrylic acid, such as methacrylic acid. Such desirable starting copolymers are described in the hereinabove referred to parent application.

Accordingly, in another aspect of this invention are provided processes by which the stiff, impact-resistant polymers of this invention can be provided from ethylene-alkyl acrylate copolymers. These processes comprise the treating of an ethylene-alkyl acrylate copolymer with the required amount of a primary or secondary amine, or ammonia, at a relatively high temperature to bring about the conversion of acrylate groups in alkyl ester form to the amide form. In the preparation, it is preferred to use a concentrated aqueous ammonia if an unsubstituted amide form is desired. Suitably, concentrated aqueous ammonium hydroxide such as about 17 N commercial products can be used. Although the specific exemplary discussion is extensively directed to the unsubstituted nitrogenous base, ammonia, it is to be understood primary and secondary amines capable of converting the alkyl ester group to the corresponding secondary and tertiary amides can be employed which result in the formation of the desired stiff, impact-resistant interpolymers. Illustratively, lower mono- and di-alkyl substituted amines such as methylamine, ethylamine, isopropylamine, diethylamine, ethanolamine, octylamine, and the like can be employed.

The employment of an inert organic reaction solvent, such as p-xylene, which will not interfere with the conversion of the acrylate to the amide form but will often permit easier recovery and processing of the obtained ethylene-acrylamide interpolymer can be incorporated into the reaction mixtures. Other solvents and solvent mixtures can be used in the reaction, such as p-xylene-isopropanol mixtures.

In the conversion, a temperature customarily upwards of 180° C. is required. Suitably, a reaction temperature of about 200° C. to about 300° C. can be employed with a preferable reaction temperature being about 200° C. to about 250° C. When the amide-forming reagent employed is ammonia, a reaction temperature of about 220–5° C. is satisfactory generally. The upper limit of the temperatures is governed by the decomposition point of the polymers as well as prevention of the formation of the groups desired in the end polymers.

Conveniently, the reaction can be carried on in a heated pressure reactor which can be mechanically agitated as by rocking and in which an autogenous pressure can be generated. In converting the copolymers of a lower alkyl ester of unsubstituted acrylic acid, such as methyl acrylate copolymers, the reaction is customarily carried on for about two to about twenty hours in order to obtain suitable formation of the desired amide-containing interpolymer. Ordinarily about three to about ten hours is a sufficient reaction period. Of course, the reaction time will vary depending upon the specific influencing factors. Particularly will the higher temperatures and, at times, longer reaction times be required occasionally when the acrylate groups of the copolymers are esters of alpha-substituted acrylic acids such as methacrylic acid esters. Also, the somewhat more stringent conditions can be used to advantage occasionally when the esters employed in the copolymer formation are derived from unsubstituted acrylic acid wherein the higher or branched alkyl groups contribute the alkyl portion of the acrylate ester.

The polymer on completion of the reaction is removed from the reactor and is separated from the reaction mixture. The polymer is suitably washed, such as with water or methanol, and is ground to provide a subdivided form and is dried, as desired.

It has been found in the above procedure that, if a small amount of caustic such as potassium or sodium hydroxide is added to the reaction mixture resulting in a percentage of the acrylate groups being present in the final preparation in carboxylate form, the ethylene-acrylamide interpolymer product is present as a slurry or suspension in the final reaction mixture, and therefore lends itself to greater use in isolation and processing. This improved process is the subject of co-pending United States application Ser. No. 512,195, filed Dec. 7, 1965, by Jack Hurst, which is a continuation of United States application Ser. No. 172,806, now abandoned, filed Feb. 12, 1962. It has been found that as little as about one mole up to about ten moles of caustic per one hundred moles of acrylate ester groups improve the recovery of the amide-containing interpolymers. Preferably, at least about two to six moles of caustic per one hundred moles of acrylate ester will generally be employed for optimum processing. The carboxylate salt groups can be converted to free acid groups by conventional procedures as by washing the polymers with a mineral acid such as hydrochloric acid. The provided copolymer is in the finely divided form, and therefore the need for grinding or subdividing is minimized or completely eliminated.

In the preparation of the amide containing interpolymers, it has been found preferred to employ ethylene-alkyl acrylate copolymers in which the acrylate groups are free of alpha-substitutions and wherein the alkyl portion of the acrylate for the most part is a lower alkyl, suitably having one to four carbon atoms and preferably being methyl. The starting copolymer will have an acrylate content as required to provide the acrylate content of the interpolymers of this invention, as above defined.

Those polymers having a high amide content, for example about fifteen percent or higher, are customarily progressively stiffer polymers on increasing amide content, but as a general rule as one approaches the higher acrylate concentration there is a concomitant noticeable lowered resistance to impact. Besides, at the higher amide contents the melt index often approaches lower than desirable values for certain fabrications.

The polymers of this invention, as hereinbefore mentioned, provide stiffness coupled with excellent impact resistance, a highly desired combination. The polymers of this invention are evaluated as to stiffness following the ASTM (American Society for Testing Materials) Test D-747-50. The preferred polymers of this invention customarily have a stiffness value in this test of at least about 10,000 p.s.i., preferably at least about 30,000 p.s.i. The polymers can be readily provided having stiffness values of fifty to sixty thousand p.s.i. and above.

As to impact evaluation of the polymers, it has been found convenient to follow the test described by C. G. Bragnaw in Modern Packaging 29, 199 (1956). In the test, the interpolymers of this invention customarily have a value in excess of about one hundred foot pounds per square inch, ordinarily at least in the range of about one hundred fifty foot pounds per square inch to about two hundred fifty foot pounds per square inch. The impact as well as the stiffness values will depend in part upon the nature of the original polymer employed, for example, the uniformity, magnitude, and variation of molecular weight, degree of branching, and the like.

The interpolymers of this invention show excellent resistance to low temperature cracking. A convenient test for testing this property of the provided interpolymers is ASTM D-746-51T. In the test, the interpolymers generally exhibit little or no cracking when the test parts are exposed to the cold conditions of the test. For example, there are routinely no failures among test part series of ten of preferred polymers provided hereby at temperatures of about 0 to $-70°$ C.

Additionally, the polymers also exhibit a high degree of resistance to stress cracking as shown in the test described by DeCoste et al., Ind. Eng. Chem., 43, 117 (1951); (commonly referred to as the "Bell Lab's Method"). Following this procedure and using a most rigorous environment of a thirty percent by weight aqueous solution of HOSTAPAL, (HL), an alkyl phenol ethylene oxide composition product, marketed by Farbwerke Hoechst A.G., the interpolymer standard parts customarily show little or no cracking at room temperature during test periods.

Other tests employed in the evaluation of the interpolymers are as follows:

*Density.*—Measured as grams/cubic centimeter at 25° C. in a gradient column in a manner as described in J. Polym. Sci. 21, 144 (1956).

*Melt Index.*—ASTM D-1238-52T.

*Crystallinity.*—Determined by X-ray diffraction procedures.

*Ultimate Tensile Strength.*—p.s.i.—ASTM D-638-56T.

*Ultimate Elongation Percent.*—ASTM D-638-56T.

*Yield.*—ASTM D-638-56T.

*Acrylate Percent of Polymers*—Infrared analysis.

*Moisture Vapor Transmission.*—Test of the Technical Association of the Pulp & Paper Industry, designation T464M-45. Test is modified by using zero and eighty percent humidities, 25° C. test temperatures, the Thwing-Albert gravimetic water vapor permeability test cups.

An usual characteristic customarily exhibited by most of the preferred interpolymers herein provided is the high degree of transparency of the fabricated articles, including not only in film but surprisingly the transparency is manifested also in molded items. Moreover, these fabricated articles customarily show a greatly desired "high gloss."

The interpolymers of this invention are resistant to xylene and thus it is suggested that they have resistance the oils. Oil resistance of course is the sought property in packaging materials not only for storage and shipment of oils per se, but also in packaging of oil-containing foodstuffs, such as corn oil-containing foods, milk, and the like. However, the interpolymers often do show considerable solubility quite surprisingly in xylene-lower alkanol solvent combinations, such as in p-xylene-isopropanol combinations; for example, a 50:50 parts by volume combination thereof has been found to be suitable solvent combination. This is a highly convenient characteristic of the polymers which enables their dissolution for the purpose of coating other materials, such as paperboard, building materials, other polymers such as cellophane, and the like. Ordinarily, the solubility in such solvent combinations as the xylene-isopropanol mixtures as described above is less as the amide concentrations of the polymer decrease.

As to moisture impermeability, film formed of the preferred amide polymers herein provided show considerable improvement over the parent ethylene-alkyl acrylate copolymers. Frequently, a three- to ten-fold improvement in the desired low moisture vapor transmission value is obtained.

The interpolymers of this invention have certain other advantageous characteristics, such as are required in order to supply quality printed or dyed film and articles such as those bearing emblems, art work, and the like.

Additives customarily employed for incorporation into polymers such as polyethylene can be elected for incorporation if desired into the interpolymers. Such additives as coloring agents, stabilizers, lubricants, ultraviolet desensitizers, antiblock agents, and the like can be employed. Also, the interpolymers can be cross linked as by employing crosslinking agents found useful in cross-linking polyethylene, or by employing agents which provide cross links between primary or secondary amide groups of the interpolymers of this invention. The selection and the procedure of incorporation of the various additives can be conducted in accordance with principles and procedures well within the knowledge and skill of the polymer art.

As is obvious from the description above, the interpolymer preparations of this invention have a wide degree of usefulness. They can be formed into films for use in a variety of needs, e.g., film wrap, packaging, et cetera. In addition, the interpolymers can be employed in the molding field such as in the molding of toys, containers, and a variety of other objects, by following injection or compression molding techniques.

The following examples are in further illustration of the compounds and processes of this invention but are not in limitation thereof except as defined by the appended claims. The ethylene-acrylate copolymers employed as the starting polymer in the examples are prepared in accordance with the hereinabove referred to parent application.

Example 1

A quantity of 575 g. of an ethylene-methyl acrylate copolymer having 24.8 percent by weight (or 0.117 mole of acrylate per mole of ethylene) of groups corresponding to methyl acrylate determined by infrared absorption is employed in the preparation (the copolymer of Example 2 of British Patent 900,969). The starting methyl acrylate copolymer has a density of 0.9365, a melt index of 1.72, an ultimate tensile strength of 1380 p.s.i., an elongation value of 690 percent, a yield value of 492 p.s.i., and a flexural stiffness value of 3000.

The copolymer together with 575 ml. of aqueous ammonium hydroxide (17 N) and 1150 ml. of p-xylene are added to a one-gallon Magne-Dash reactor. The reaction mixture is heated to 230° C. by means of a heating jacket surrounding the reactor at autogenous pressure and is maintained at the 230° C. temperature for 15 hours. The reaction mixture is cooled and the amide polymeric product consisting of a tough white solid is removed. The polymeric product is washed thoroughly with methanol and is ground to a small particle size employing a Wiley mill. The ground amide polymer is dried in vacuo at 50° C. The dried product on infrared analysis shows that essentially all of the methyl acrylate groups are converted to the amide form.

The formed amide interpolymer product is characterized as follows: 3.07 percent nitrogen; about all of the starting ester groups are converted to amide groups; 0.9528 g./cc. density; 147 ft. lbs./sq. in. tensile impact; 200 percent elongation at a rate of stretch of 10 in./min.; 0/10 failures at —70° C. brittleness value; and 31,000 lbs./sq. in. flexural stiffness.

The hereinabove procedure is repeated with the exceptions that 100 g. of the ethylene-methyl acrylate copolymer, 1200 ml. of the concentrated ammonium hydroxide, 0.5 g. of sodium hydroxide, 220° C. temperature, a 16-hour reaction period, are employed. Infrared analysis shows conversion of essentially all of the ester groups.

Example 2

A quantity of 300 g. of an ethylene-methyl acrylate copolymer containing 20.6 percent by weight of groups corresponding to methyl acrylate as determined by infrared analysis is employed in the preparation. The starting methyl acrylate copolymer has a density of 0.9421, a melt index of 1.75, an ultimate tensile strength of 1500, an elongation value of 800, a yield value of 460, and a flexural stiffness value of 2690. The copolymer, together with 300 ml. of aqueous ammonia (17 N) and 600 ml. of p-xylene are added as a reaction mixture to a two-liter cylindrical pressure reactor. The reaction mixture is heated to 230° C. for twelve hours by applying heat externally to the reactor mechanically agitated by rocking.

On completion of the reaction, the reaction mixture is cooled and the amide polymer consisting of a tough rubbery solid is removed and is treated as described under Example 1 above.

The amide polymer product analyses: 3.06 percent nitrogen showing about 90 percent of the starting ester groups are converted to amide groups.

The above experiment is repeated two times following essentially the above procedure and the products are pooled to form a uniform blend. The combined material is characterized as follows: 3.07 percent nitrogen; 91.6 percent of the starting ester groups are converted to amide groups; 0.9494 g./cc. density; 205 ft. lbs./sq. in. tensile impact; 280 percent elongation; 0/10 failures at —70° C. brittleness value; and 41,000 lbs./sq. in. flexural stiffness.

Example 3

A quantity of 300 g. of an ethylene-methyl acrylate copolymer containing 0.109 mole of acrylate groups per mole of ethylene groups is employed (the copolymer of Example 3 of British Patent 900,969). The starting methyl acrylate copolymer has a density of 0.9443 g./cc., a melt index of 0.34, an ultimate tensile strength of 2460 p.s.i., an elongation value of 840 percent, a yield value of 150, and a flexural stiffness value of 3300 lb./sq. in. The methyl acrylate copolymer, together with 300 ml. of 17 N aqueous ammonium hydroxide, 600 ml. of p-xylene are added to a two-liter pressure reactor. The reaction mixture is heated to 230° C. for twelve hours with agitation by rocking. The reaction mixture is cooled and the amide polymer product which consists of a white solid is removed. The polymer product is washed with methanol and is ground to provide a finely divided product which is dried.

The amide polymer product has the following properties: 3.18 percent nitrogen; 84.4 percent of the starting ester groups are converted to amide groups; 0.9503 g./cc. density; 128 ft. lbs./sq. in. tensile impact; 240 percent elongation; zero of ten failures at —70° C. brittleness value; and 33,400 lbs./sq. in. flexural stiffness.

The above procedure is repeated four times and the products are combined and thoroughly mixed. The combined material is characterized as follows: 3.47 percent nitrogen; 93.5 percent of the starting ester groups are converted to amide groups; 0.9497 g./cc. density; 240 percent elongation; 0/10 failures at —70° C. brittleness value; and 60,000 lb./sq. in. flexural stiffness.

Example 4

A quantity of 250 g. of an ethylene-methyl acrylate copolymer containing 0.054 mole of methyl acrylate per mole of ethylene groups is employed (the copolymer of Example 1 of British Patent 900,969). The starting methyl acrylate copolymer has a density of 0.9365 g./cc., a melt index of 1.72, an ultimate tensile strength of 1380 p.s.i., an elongation value of 690 percent, an impact value of 2560 p.s.i., a yield value of 492 p.s.i., and a flexural stiffness value of 3000 lb./sq. in. The methyl acrylate copolymer, together with 600 ml. of 17 N aqueous ammonium hydroxide and 1400 ml. of p-xylene are added to a two-liter pressure reactor. The reaction mixture is heated to 225° C. for 16.5 hours with agitation by rocking. A pressure of about 850 p.s.i. is generated during the reaction. The reaction mixture is cooled and the amide polymer product which consists of a white solid is removed. The polymer product is washed with methanol and is ground to provide a finely divided product which is dried.

The amide polymer product has the following properties: 1.5 percent nitrogen; 50.6 percent of the starting ester groups are converted to amide groups; 198 ft. lbs./sq. in. tensile impact; a melt index of 0.2; zero of ten failures at —72° C. brittleness value; and 13,500 lbs./sq. in. flexural stiffness.

Example 5

A quantity of 200 g. of an ethylene-methyl acrylate copolymer containing 0.04 mole of acrylate per mole of ethylene groups is employed. The starting methyl acrylate copolymer has a density of 0.9350 g./cc., a melt index of 2.45, an impact value of 2400 p.s.i., an ultimate tensile strength of 1952 p.s.i., an elongation value of 700 percent, a yield value of 760 p.s.i., and a flexural stiffness value of 7650 lb./sq. in. The methyl acrylate copolymer, together with 500 ml. of 17 N aqueous ammonium hydroxide, 200 ml. of p-xylene were added to a two-liter pressure reactor. The reaction mixture is heated to 250° C. for 14 hours with agitation by rocking. The reaction mixture is cooled and the amide polymer product which consists of a white solid is removed. The polymer product is washed with methanol, is ground to provide a finely divided product which is dried.

The amide polymer product has the following properties: 1.52 percent nitrogen; 88.9 percent of the starting ester groups are converted to amide groups; 0.9336 g./cc. density; 222 ft. lbs./sq. in. tensile impact; 480 percent elongation; zero of ten failures at −70° C. brittleness value; and 17,000 lbs./sq. in. flexural stiffness.

*Example 6*

The procedures outlined in Examples 1–5 above can be repeated to provide amide-containing interpolymers within the scope of this invention by employing other ethylene-alkyl acrylate copolymers instead of the ethylene-methyl-acrylate copolymers. Illustrative of such ethylene-alkyl acrylate copolymers are the respective copolymers containing groups corresponding to butyl acrylate, hexyl acrylate, lauryl acrylate, ethyl acrylate, and 2-ethylhexyl acrylate. The reaction is carried on in order to provide the amide-containing interpolymers at about 250° C. to 270° C. for a time sufficient to provide the degree of amide formation desired, for most preparation, about ten to sixteen hours being an adequate reaction period.

Likewise, amide-containing interpolymers within the scope of this invention can also be provided by employing ethylene-methacrylate copolymers instead of ethylene-methyl acrylate copolymers. Illustrative of such ethylene-alkyl methacrylate copolymers are the respective copolymers containing groups corresponding to butyl methacrylate, stearyl methacrylate, methyl methacrylate, and 2-ethylhexyl methacrylate. The reaction is carried on in order to provide the amide-containing interpolymers at about 270–300° C. for a time sufficient to provide the degree of amide formation desired, for most preparations about five to twelve hours being an adequate reaction period.

*Example 7*

A quantity of 10 g. of methyl methacrylate copolymer containing by weight 15 percent groups corresponding to methyl methacrylate as determined by infrared analysis is employed.

The above quantity of the methyl methacrylate copolymer, together with 0.2 g. of sodium hydroxide and 60 ml. of concentrated ammonium hydroxide (17 N) are introduced to a 135 ml. pressure reactor. The reaction mixture is heated to 275° C. for a period of 16 hours with agitation.

On completion of the reaction, the reaction mixture is cooled and the amide polymer product is removed from the reactor. The amide polymer product consists of flat, white oval shaped pellets. The solid product of the amide polymer is removed from the reaction mixture, is washed thoroughly with water, and is ground and dried as described in Example 1. Infrared analysis shows essentially all of the acrylate groups are converted to amide groups.

*Example 8*

A quantity of 300 g. of an ethylene-methyl acrylate copolymer (the copolymer of Example 1 of British Patent 900,969), having a crystallinity of about 50.4 percent, is added to a 2-liter autoclave ammonolysis chamber along with 300 ml. of concentrated ammonium hydroxide (15 N) and 600 ml. of xylene. The mixture is heated with constant agitation at about 225° C. for about 12 hours. Upon completion of the reaction, the residue comprising the amide derivative of the polymer is removed, washed with a methanol-acetone mixture and is air dried. The dried amide polymer is ground, and a portion of the ground polymer is pressed into film. The pressed film has a crystallinity of 28 percent and is a relatively stiff and very tough film of high clarity.

*Example 9*

The amide of an ethylene-methyl acrylate copolymer (the copolymer of Example 2 of British Patent 900,969) prepared according to the procedure of Example 8 appeared essentially non-crystalline, whereas the copolymer itself showed a 41.3 percent crystallinity, both as pressed films.

*Example 10*

A quantity of 350 g. of an ethylene-methyl acrylate copolymer containing 37 weight percent methyl acrylate (.161 mole percent methyl acrylate) as determined by infrared analysis and having a melt index of 1000 is introduced into a Magne-Drive reactor along with 1600 ml. ammonium hydroxide (28 weight percent ammonia) and 0.6 g. of sodium hydroxide. The mixture is heated with constant agitation at about 270° C. for about eight hours. Upon completion of the reaction the residue comprising finely divided solids is removed, washed with deionized water, and is air dried.

The dried amide polymer upon analysis is characterized by conversion of 89 mole percent of the starting ester groups to the amide form. The formed polymer is further characterized by having a tensile yield strength of 5206 lbs./sq. in.; a tensile break strength of 5182 lbs./sq. in.; a Shore D hardness of 77; and a flexural stiffness of 136,500 lbs./sq. in. From the above data it is readily apparent that the product polymer produced from a starting polymer containing .191 mole of methyl acrylate per mole of ethylene has surprisingly high stiffness and would exhibit excellent resistance to damage on impact.

*Example 11*

A quantity of 350 g. of an ethylene-methyl acrylate copolymer containing 48 weight percent methyl acrylate (.156 mole percent methyl acrylate) as determined by infrared analysis, and having a melt index of 14.3, an inherent viscosity of 0.7616, and a Shore A hardness of 31, in introduced into a Magne-Drive reactor along with 1600 ml. of ammonium hydroxide (28 weight percent ammonia) and 0.6 g. of sodium hydroxide. The mixture is heated with constant agitation at about 270° C. for about seven hours. Upon completion of the reaction the formed amide derivative of the polymer is coagulated using acetone.

The product amide polymer upon analysis is shown to have 84.5 mole percent of the starting ester groups converted to amide groups. The product interpolymer is further characterized by having a tensile strength of 6514 lbs./sq. in.; a tensile break strength of 6514 lbs./sq. in.; a Shore D hardness of 80; and a flexural stiffness value of 173,074 lbs./sq. in.

This example demonstrates the effectiveness of producing a polymer having a surprisingly high flexural stiffness, tensile strength and impact resistance from a starting interpolymer containing a high concentration (.304 mole of methyl acrylate per mole of ethylene) of methyl acrylate.

*Example 12*

A quantity of 350 g. of an ethylene-methyl methacrylate copolymer containing 41.4 weight percent methyl methacrylate (.132 mole percent methyl methacrylate) as determined by infrared analysis is employed in the preparation of the amide polymer of this invention. The starting methyl methacrylate copolymer is introduced into a Magne-Drive reactor along with 1600 ml. of ammonium hydroxide (28 weight percent ammonia) and 0.6 g. of sodium hydroxide. The mixture is heated with constant agitation at about 270° C. for about eight hours. Upon completion of the reaction, the residue comprising the amide derivative of the polymer is removed as a finely divided solid, washed with deionized water, and air dried.

The product polymer is characterized by having 86.5 mole percent of the starting ester groups converted to amide groups. The product polymer has a tensile yield strength of 3312 lbs./sq. in.; a tensile break strength of 3789 lbs./sq. in.; 213 percent elongation at a rate of stretch of 10 in./min.; and a flexural stiffness of 93,395 lbs./sq. in.

From the results obtained in this example, it is readily apparent that a product polymer of high stiffness and impact resistance is produced from a starting polymer having a high concentration of methyl methacrylate by the conversion of 86.5 mole percent of the ester groups to the amide form.

What is claimed is:

1. A stiff, highly transparent, impact resistant, normally solid carbamyl-substituted interpolymer of ethylene having a structure corresponding to a copolymer of ethylene with an alkyl acrylate in which the alkyl group has from one to about twenty carbon atoms and said alkyl acrylate groups are evenly distributed throughout the polymeric chains in the proportion of from about 0.04 to 0.11 mole of acrylate per mole of ethylene, from about 50 percent to 100 percent of said acrylate groups having been converted from ester to corresponding amide form, said interpolymer having a flexural stiffness of at least about 13,500 lbs. per square inch, containing from about 1.5 to 3.2 percent by weight nitrogen, having a tensile impact value varying from about 120 to 220 lbs. per sq. inch, a density varying from about 0.93 to 0.95 g. per cc., said interpolymer being resistant to xylene but exhibiting solubility in a hot mixture of equal parts of xylene and isopropanol.

2. A composition of claim 1 wherein the said alkyl acrylate is methyl acrylate.

3. A process of forming a stiff, impact-resistant interpolymer consisting essentially of heating an ethylene-alkyl acrylate copolymer in which the alkyl group has from one to about twenty carbon atoms and said alkyl acrylate groups are evenly distributed throughout the polymeric chains in the proportion of from about 0.04 to 0.11 mol of acrylate per mol of ethylene, with an amide-forming reagent selected from the class consisting of primary and secondary amines and ammonia to a reaction temperature of at least about 180° C., and recovering therefrom a carbamyl-substituted interpolymer of ethylene and alkyl acrylate wherein from about 50 percent to 100 percent of said acrylate groups have been converted from ester to corresponding amide form.

4. A process of claim 3 wherein the reaction temperature is in the range of about 200° C. to about 300° C.

5. A process of claim 4 wherein the amide-forming reagent is ammonia.

6. A stiff, highly transparent, impact-resistant, normally solid carbamyl-substituted interpolymer of ethylene having a structure corresponding to a copolymer of ethylene with an alkyl acrylate in which the alkyl group has from about 1 to about 20 carbon atoms and said alkyl acrylate groups are distributed throughout polymeric chains in the proportion of about 0.01 to 0.5 mole of acrylate per mole of ethylene, from about 10 to 100 percent of said acrylate groups having been converted from ester to corresponding amide form.

7. The composition of claim 6 wherein said alkyl acrylates are distributed throughout the polymeric chains in the proportion of from about 0.025 to 0.25 mole of acrylate per mole of ethylene.

8. The composition of claim 7 wherein from about 50 to 100 percent of said acrylate groups have been converted to corresponding amide form.

9. The composition of claim 8 wherein said alkyl acrylate is selected from the group consisting of methyl acrylate and methyl methacrylate.

10. A process of forming a stiff, impact-resistant interpolymer consisting essentially of heating an ethylene-alkyl acrylate copolymer in which the alkyl group has from 1 to about 20 carbon atoms and said alkyl acrylate groups are distributed throughout polymeric chains in the proportion of about 0.01 to 0.5 mol of acrylate per mol of ethylene, with an amide-forming reagent selected from the class consisting of primary and secondary amines and ammonia to a reaction temperature of at least about 180° C., and recovering therefrom a carbamyl-substituted interpolymer of ethylene and an alkyl acrylate in which from about 10 to 100 percent of said acrylate groups have been converted from ester to corresponding amide form.

11. The process of claim 10 wherein the reaction temperature is in the range of about 200° C. to about 300° C.

12. The process of claim 11 wherein the amide-forming reagent is ammonia.

13. The process of claim 12 wherein from about 50 to 100 percent of said acrylate groups have been converted from ester to corresponding amide form.

References Cited

UNITED STATES PATENTS

| | | | |
|---|---|---|---|
| 2,146,209 | 2/1939 | Graves | 260—72 |
| 2,265,937 | 12/1941 | Dittmar | 260—89.1 |
| 2,646,425 | 7/1953 | Barry | 260—86.7 |
| 2,953,541 | 9/1960 | Pecha et al. | 260—86.7 |
| 2,953,551 | 9/1960 | White | 260—86.7 |
| 2,985,663 | 5/1961 | Welch | 260—86.7 |
| 3,089,897 | 5/1963 | Balmer et al. | 260—86.7 |

JOSEPH L. SCHOFER, *Primary Examiner.*

H. WONG, *Assistant Examiner.*

UNITED STATES PATENT OFFICE
CERTIFICATE OF CORRECTION

Patent No. 3,337,517                          August 22, 1967

Harry D. Anspon

It is hereby certified that error appears in the above numbered patent requiring correction and that the said Letters Patent should read as corrected below.

Column 2, line 66, for "use" read -- ease --; column 4, line 13, for "usual" read -- unusual --; line 21, for "the", first occurrence, read -- to --; same line 21, for "the", second occurrence, read -- a --; column 8, line 31, for "in" read -- is --.

Signed and sealed this 13th day of August 1968.

(SEAL)
Attest:

Edward M. Fletcher, Jr.                          EDWARD J. BRENNER
Attesting Officer                                Commissioner of Patents